United States Patent
Roske et al.

(10) Patent No.: US 11,274,732 B2
(45) Date of Patent: Mar. 15, 2022

(54) DUAL-CLUTCH TRANSMISSION ARRANGEMENT, AND MOTOR VEHICLE

(71) Applicant: ZF Friedrichshafen AG, Friedrichshafen (DE)

(72) Inventors: Michael Roske, Friedrichshafen (DE); Johannes Kaltenbach, Friedrichshafen (DE); Thomas Rosemeier, Meckenbeuren (DE); Juri Pawlakowitsch, Kressbronn (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 152 days.

(21) Appl. No.: 16/493,418

(22) PCT Filed: Feb. 13, 2018

(86) PCT No.: PCT/EP2018/053502
§ 371 (c)(1),
(2) Date: Sep. 12, 2019

(87) PCT Pub. No.: WO2018/166730
PCT Pub. Date: Sep. 20, 2018

(65) Prior Publication Data
US 2020/0132168 A1 Apr. 30, 2020

(30) Foreign Application Priority Data
Mar. 13, 2017 (DE) ...................... 10 2017 204 127.7

(51) Int. Cl.
*F16H 3/00* (2006.01)
*F16H 3/093* (2006.01)

(52) U.S. Cl.
CPC ............ *F16H 3/006* (2013.01); *F16H 3/093* (2013.01); *F16H 2003/008* (2013.01); *F16H 2003/0931* (2013.01)

(58) Field of Classification Search
CPC .... F16H 3/006; F16H 3/093; F16H 2003/008; F16H 2003/0931
(Continued)

(56) References Cited

U.S. PATENT DOCUMENTS 4,823,628 A * 4/1989 Hiraiwa .................. F16H 3/006
74/330
5,392,665 A * 2/1995 Muller .................... F16H 3/093
74/330
(Continued)

FOREIGN PATENT DOCUMENTS

DE 19807374 A1 4/1999
DE 102011005532 A1 9/2012
(Continued)

OTHER PUBLICATIONS

German Search Report DE102017204127.7, dated Mar. 21, 2018. (12 pages).
(Continued)

*Primary Examiner* — Ha Dinh Ho
(74) *Attorney, Agent, or Firm* — Dority & Manning, P.A.

(57) ABSTRACT

A dual clutch transmission arrangement (4) includes a first clutch (K1) and a second clutch (K2) for connecting a drive unit (2) to a first sub-transmission and to a second sub-transmission. The first clutch (K1) is connected to both transmission input shafts. A motor vehicle with the dual clutch transmission arrangement (4) is also provided.

16 Claims, 7 Drawing Sheets

(58) Field of Classification Search
USPC .................................................. 74/330, 661
See application file for complete search history.

(56) References Cited

U.S. PATENT DOCUMENTS

| | | | |
|---|---|---|---|
| 5,823,051 A * | 10/1998 | Hall, III | F16H 37/042 |
| | | | 74/325 |
| 5,856,709 A | 1/1999 | Ibaraki et al. | |
| 7,258,032 B2 * | 8/2007 | Kim | F16H 3/006 |
| | | | 74/330 |
| 8,960,033 B2 | 2/2015 | Kaltenbach et al. | |
| 9,382,974 B2 * | 7/2016 | Kim | F16H 3/006 |
| 10,844,935 B2 * | 11/2020 | Wu | F16H 3/089 |
| 2010/0206107 A1 | 8/2010 | Gumpoltsberger et al. | |
| 2010/0311540 A1 * | 12/2010 | Hellenbroich | B60L 1/003 |
| | | | 477/5 |
| 2012/0216638 A1 * | 8/2012 | Pritchard | F16D 21/06 |
| | | | 74/329 |

FOREIGN PATENT DOCUMENTS

| | | |
|---|---|---|
| EP | 0029711 A2 | 6/1981 |
| EP | 0773127 A2 | 5/1997 |
| JP | S60227044 A | 11/1985 |
| WO | WO 2009/050076 A1 | 4/2009 |

OTHER PUBLICATIONS

International Search Report (English Translation) PCT/EP2018/053502, dated May 7, 2018. (5 pages).

* cited by examiner

DUAL-CLUTCH TRANSMISSION ARRANGEMENT, AND MOTOR VEHICLE

FIELD OF THE INVENTION

The invention relates generally to a dual clutch transmission arrangement that includes a first clutch and a second clutch for connecting a drive unit to a first sub-transmission and to a second sub-transmission.

BACKGROUND

In most dual clutch transmissions, the internal combustion engine is connected to an input part of a dual clutch, and the output sides of the dual clutch are connected to coaxially mounted transmission input shafts.

It is also known, however, to arrange the two clutches in the transmission itself in order to establish the overlap control. The synchronizing mechanisms for establishing a connection between a first/idler gear and a shaft are often also referred to as separating clutches. Such synchronizing mechanisms differ from the clutches insofar as the clutches can transmit the total torque output by the drive unit. In contrast, synchronizing mechanisms operate when clutches are disengaged, i.e., when no torque is transmitted from the drive unit to the transmission.

SUMMARY OF THE INVENTION

Example aspects of the present invention provide a dual clutch transmission arrangement, which can be handled in a more flexible manner with respect to installation space specifications.

In order to solve this problem, the first clutch is connected to the two transmission input shafts.

The terms "first" and "second" are intended merely to differentiate the clutches, but not to rank such clutches. The first clutch is, by definition, the clutch that is connected to both transmission input shafts. The other clutch is the second clutch.

Due to the fact that one of the two clutches is connected to both transmission input shafts, the second clutch can be arranged spatially at a distance from the first clutch. As a result, space can be created for other transmission elements, in particular, in the area of the clutch bell housing.

Advantageously, the second clutch can be arranged between two gear set planes. A gear set plane is usually considered to be the axial area occupied by the gearwheels of one or two gears. There is an axial distance between the gear set planes, in which, for example, shift elements can be arranged.

The second clutch can be arranged between the gear sets of odd gears. Alternatively, the second clutch can be arranged between the gear sets of even gears. Further alternatively, the second clutch can be arranged between the gear sets of even gears and odd gears. Each of the embodiments has its own advantages and disadvantages. An arrangement between even and odd gear sets is preferred. Regardless of the precise arrangement of the gear sets, the second clutch can be arranged at the end of the hollow transmission input shaft. Usually, this is also the point at which the second clutch is located between the even gear set planes and the odd gear set planes.

The reverse gear is considered, in principle, to be an even gear in this case; this applies at least for as long as a gearwheel of the reverse gear is located on the transmission input shaft that includes the even gears. This assignment is not always unambiguously implementable, however, since both transmission input shafts or two countershafts are utilized, in part, for forming the reverse gear. In a further alternative, the second clutch is located between the gear set plane of the reverse gear and another gear set plane; this gear set plane can include even gears or odd gears.

Alternatively to the arrangement between two gear set planes, the second clutch can be arranged, on the transmission-end side, downstream from the gearset planes. In other words, the second clutch can be arranged on the end of the gear set housing facing away from the engine.

Advantageously, the second clutch can enclose a shaft. In the case of the arrangement between the gear set planes, the second clutch can be arranged between multiple shafts. The cavity usually present in the center of a clutch can also be utilized, however, for sliding the second clutch onto a shaft. This encompasses the embodiment in which the second clutch has been slid onto the hollow transmission input shaft and then encloses two shafts.

In a further embodiment, the second clutch can enclose multiple shafts, specifically parallel, non-coaxial shafts. In the extreme case, the second clutch can be located on the inside of the transmission housing, although, due to the resultant diameter, a uniform actuation around the perimeter is made difficult as a result. It is therefore preferred when the second clutch encloses only one shaft.

In addition to the clutches for connecting the drive unit, usually an internal combustion engine, to the transmission input shafts, the dual clutch transmission arrangement can also include a third clutch, which disconnects the drive unit from the transmission. This is arranged, with respect to power flow, between the first drive unit and the first and second clutches and is always provided when a second drive unit is present, in particular in the form of an electric motor. The electric motor can be present in a P2 or P3 configuration, i.e., the electric motor acts on either the transmission input shafts or on the transmission itself. In this case, the third clutch, which is often referred to as "K0", is utilized for decoupling the internal combustion engine from the transmission for a purely electric operation and, in this way, minimizing the power loss of the internal combustion engine or, more generally, of the first drive unit during a purely electric operation.

This third clutch is advantageously arranged in the clutch bell housing. As described above, the clutch bell housing is the part of the transmission housing, in which the clutch or the clutches is/are usually arranged. The third clutch and the first clutch can be arranged in a radially nested manner. Therefore, the first clutch can be located within the third clutch, or vice versa, wherein an overlap occurs, at least partially, in the axial direction. Alternatively, the first clutch and the third clutch can also be axially successively arranged. Preferably, the third clutch is arranged radially within the first clutch. Preferably, the input side of the first clutch is directly connected to the output of the third clutch.

In addition, the input side of the first clutch, i.e., the clutch in the clutch bell housing, can be connected to one transmission input shaft and the output side can be connected to the other transmission input shaft. As a result, the second drive unit, in particular an electric motor, can access or drive both transmission input shafts.

Advantageously, the output of the third clutch can be connected to the input of the first clutch and to the input of the second clutch. The connection to the second clutch within the transmission housing part including the gear set is possible, in this case, with the aid of transmission components and, for example, the first clutch.

The dual clutch transmission arrangement is advantageously a hybridized dual clutch transmission arrangement.

The first clutch and/or the second clutch and/or the third clutch are/is advantageously designed as a multi-disk clutch. It is further preferred when such clutches are wet-running.

Preferably, the first clutch can be designed as a launch clutch.

The dual clutch transmission arrangement advantageously has a countershaft design. This is intended for purposes of clarification, since all dual clutch transmissions have a countershaft design.

Advantageously, the transmission input shafts can be coaxially arranged and the first clutch can be connected, on the input side, to the inner transmission input shaft. Preferably, the first clutch can also be connected, on the output side, to the outer transmission input shaft. As a result, it is possible, by engaging the first clutch, to drive the first sub-transmission while the transmission input shaft of the second sub-transmission is driven, provided the first clutch is incorporated in the power flow. This does not depend on the disengagement or engagement of the first clutch, but rather on whether a further clutch is also provided in the drive train, as is represented further below. As a result, it is possible that the first clutch is connected to both transmission input shafts, but, regardless thereof, the first sub-transmission and the second sub-transmission can be incorporated into the power flow.

Preferably, the first clutch can be associated with the sub-transmission that has the odd gears. Therefore, the odd gears are preferably on the coaxially outer transmission input shaft. Preferably the first clutch is then a launch clutch. This means, the first clutch is designed to be suitable for allowing the motor vehicle to pull away from rest.

Preferably, the dual clutch transmission arrangement can include a second drive unit. While the first dual clutch transmission arrangement is connectable only to the first drive unit, the second drive unit, which is preferably designed as an electric motor, can be contained directly on or in the dual clutch transmission arrangement. In particular, an arrangement of the electric motor in the area of the first clutch is possible, since space was created there due to the deviating positioning of the second clutch.

Advantageously, the dual clutch transmission arrangement can include a separating clutch for disconnecting the first drive unit from the drive train. The separating clutch is utilized for enabling the motor vehicle to be operated using an electric motor without drag losses due to an internal combustion engine.

The invention also relates to a motor vehicle including a dual clutch transmission arrangement. The motor vehicle is distinguished by the fact that the dual clutch transmission arrangement is designed as described above.

BRIEF DESCRIPTION OF THE DRAWINGS

Further advantages, features, and details of the invention result from the following description of exemplary embodiments and figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
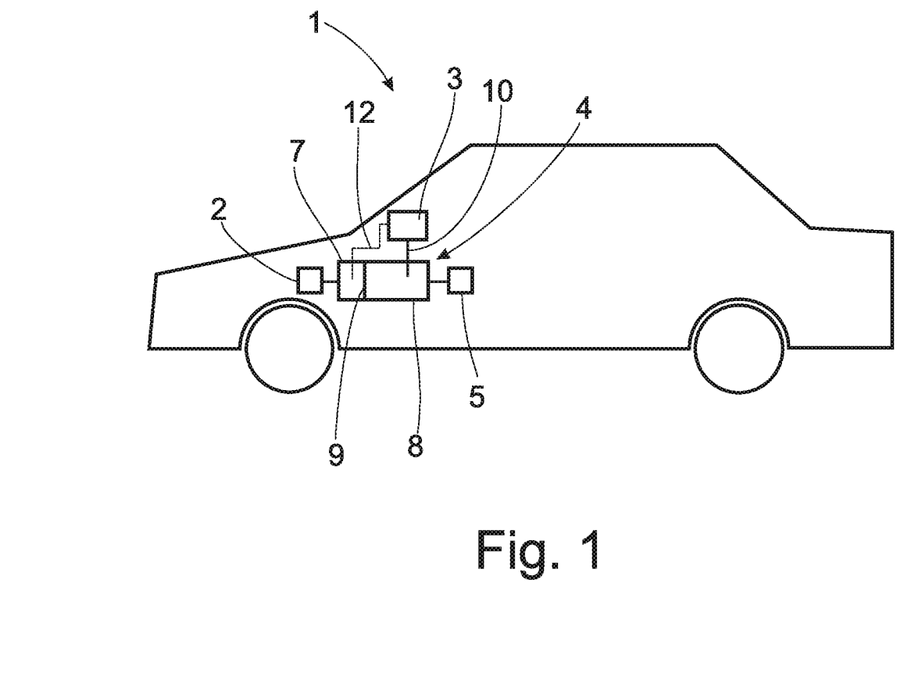
FIG. 1 shows a motor vehicle.

FIG. 1 shows a motor vehicle 1 including a first drive unit 2, a second drive unit 3, a dual clutch transmission arrangement 4, and a differential 5. A transmission housing usually consists of two parts, namely the clutch bell housing 7 and the gear set housing 8, which accommodates the gear set. The clutch bell housing 7 and the gear set housing 8 are usually fixedly flanged to one another; an intermediate wall 9 can be located therebetween. The intermediate wall 9 is designed to be oil-tight, depending on whether the oil spaces of the clutch bell housing and of the gear set housing are to be separated. At the least, the intermediate wall 9 is usually utilized for mounting at least a portion of the shafts of the dual clutch transmission arrangement 4.

The second drive unit 3, in particular an electric motor, can act on the drive train either as indicated with the aid of the line 10 or as indicated with the aid of the line 12. A cooperation with one or both transmission input shafts is referred to as a P2 configuration and a cooperation with the transmission itself is referred to as a P3 configuration.

The clutches for connecting the first drive unit 2 to one of the transmission input shafts of the dual clutch transmission arrangement 4 in each case are referred to as clutches in the following. The clutch for disconnecting the internal combustion engine from the dual clutch transmission arrangement 4 is referred to as a separating clutch K0.

Figure 2:
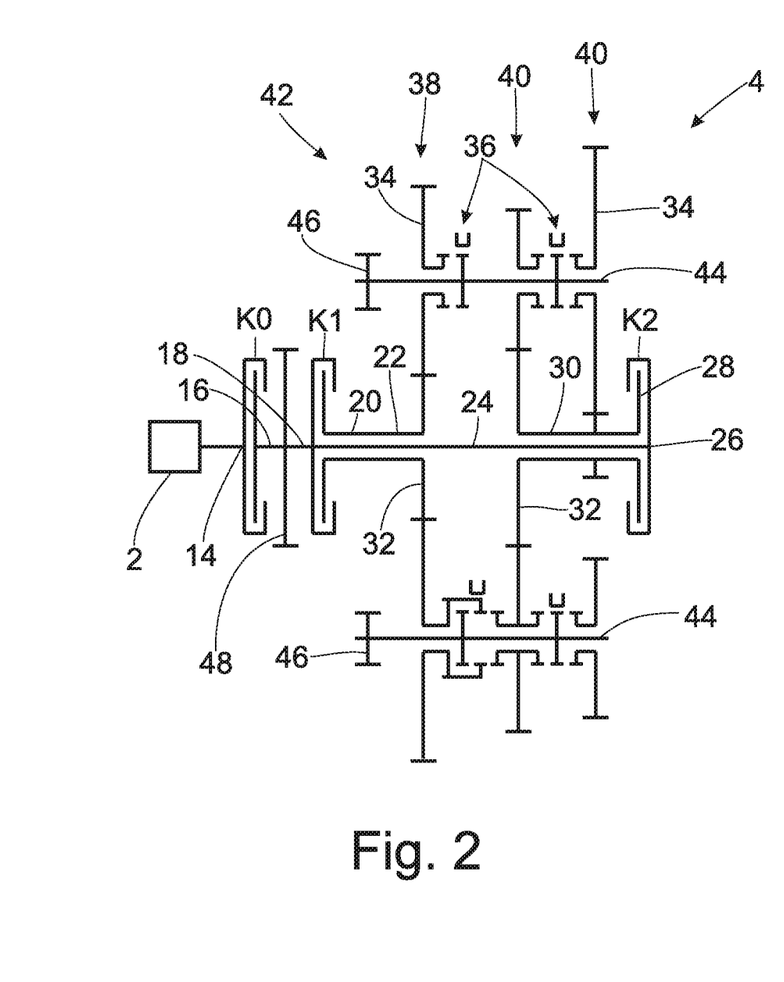
FIG. 2 shows a diagrammatic configuration of a dual clutch transmission arrangement in a first embodiment.

FIG. 2 shows a first embodiment of a dual clutch transmission arrangement 4 and, in fact, as a gear set scheme. The separating clutch K0 is coupled to the first drive unit 2. Damping devices, such as a dual-mass flywheel or a rotational speed-adaptive damper, can be arranged between the first drive unit 2 and the separating clutch K0. In these embodiments as well, the separating clutch K0 disconnects the first drive unit 2 from the rest of the drive train. In particular, the connection between the first drive unit 2 and the separating clutch K0 can be considered to be a direct connection even when a dual-mass flywheel or a rotational speed-adaptive damper is present, since the above-mentioned components are to merely reduce vibrations, but not to release the connection between the drive unit 2 and the separating clutch K0.

The drive unit 2 is therefore located at the input 14 of the separating clutch K0. The output 16 of the separating clutch K0, however, is connected to the input 18 of the first clutch K1. The output of the first clutch K1 is coupled to the first transmission input shaft 22. The coupling usually takes place with the aid of a spline. FIG. 2 shows an embodiment of the transmission input shaft 22 as a hollow shaft. As a result, the separating clutch K0 can be connected via the connecting shaft 24 to the input 26 of the second clutch K2. The output 28 of the second clutch K2 is then connected to the second transmission input shaft 30, which is also designed as a hollow shaft and which encloses the connecting shaft 24. The various gear steps can be implemented with the aid of the first/fixed gears 32, the second/idler gears 34, and the shift elements 36. Gear set planes 38 and gear set planes 40 are formed, wherein the gear set planes 38 are the gear set planes associated with the first transmission input shaft 22 and the gear set planes 40 are the gear set planes associated with the second transmission input shaft 30. The representation of the gear set planes 38 and 40 is diagrammatic insofar as they are to merely indicate the presence of gear set planes 38, for example, for even gears, and gear set planes 40, for example, for odd gears. However, a limitation to a certain number of, for example, fixed gears on the first transmission input shaft 22 or on the second transmission input shaft 30 is not to be applied. The gear set 42 also encompasses one or two countershafts 44, which cooperate with fixed gears 46, which lead to the driven end or to the differential. The connection of the second drive unit 3 can take place with the aid of a gearwheel 48, which is arranged between the separating clutch K0 and the first clutch K1 in FIG. 2. In this way, the second drive unit 3 is connectable to both transmission input shafts; the arrangement corresponds to a P2 configuration.

The configuration of the gear set 42 is arbitrary, in principle; the dual clutch transmission arrangement 4 differs from the prior art in that the clutch K2 is arranged in the gear set housing 8, while the clutch K1 is arranged in the clutch bell housing 7. In the embodiment according to FIG. 2, the clutch K2 is arranged, on the transmission-end side, downstream from the gear set planes 38 and 40. It is therefore located at the end of the transmission housing 6 facing away from the engine.

Figure 3:
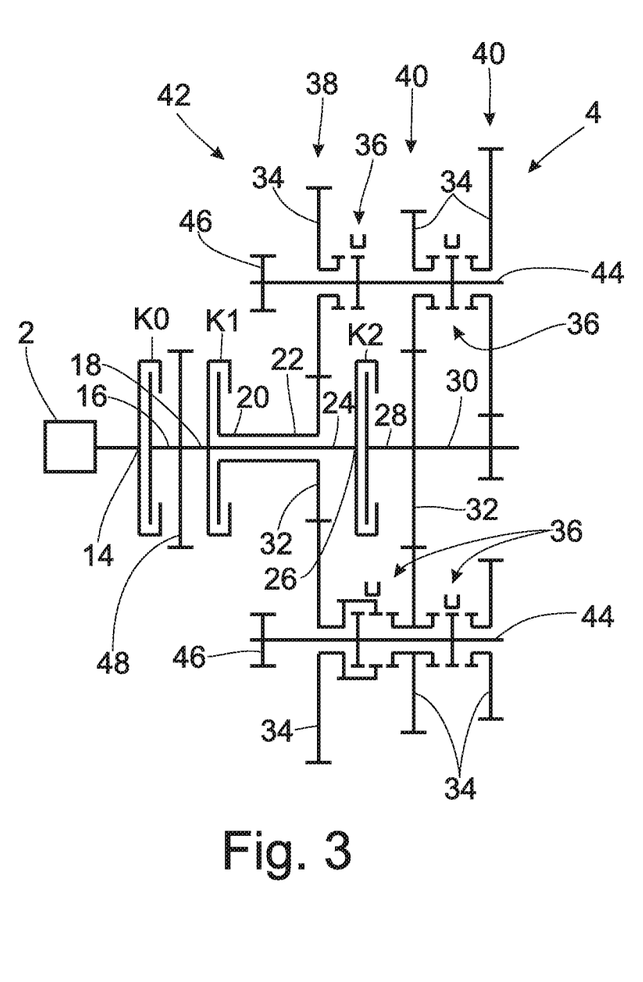
FIG. 3 shows a diagrammatic configuration of a dual clutch transmission arrangement in a second embodiment.

FIG. 3 shows a similar embodiment as in FIG. 2. The comments made with respect to FIG. 2 therefore also apply for FIG. 3. The differences are explained in the following. In contrast to FIG. 2, the clutch K2 is arranged between various gear set planes and, in fact, between gear set planes 38 and 40, i.e., therefore, between the gear set planes of even gears and odd gears. Due to this arrangement, the second transmission input shaft 30 is also not designed as a hollow shaft and it does not enclose the connecting shaft 24. For the rest, the gear set 42 according to FIG. 3 corresponds to the gear set 42 according to FIG. 2.

Figure 4:
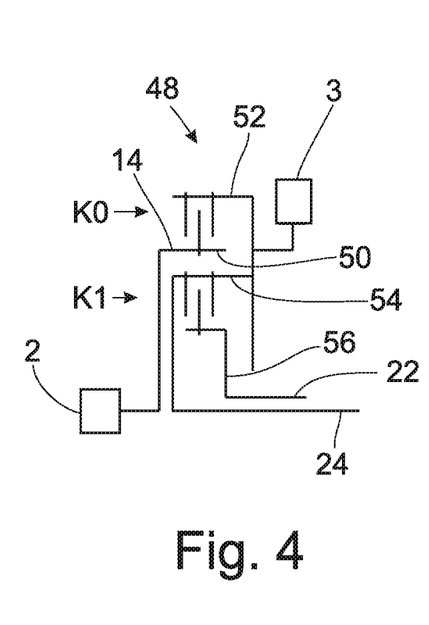
FIG. 4 shows a dual clutch arrangement in a first embodiment.

FIG. 4 diagrammatically shows a dual clutch arrangement including the separating clutch K0 and the clutch K1. In this embodiment, the separating clutch K0 and the clutch K1 are arranged in a radially nested manner, wherein the separating clutch K0 is located radially outward. The input 14 of the separating clutch K0 is formed by the inner disk carrier 50 of the separating clutch K0. The separating clutch K0 is designed as a multi-disk clutch and therefore includes, in addition to the inner disk carrier 50, an outer disk carrier 52 and a disk pack consisting of nested outer clutch disks and inner clutch disks. The second drive unit 3 is connected to the outer disk carrier 52 and, therefore, to the output 16 of the separating clutch K0. The input 18 of the clutch K1 is also connected to the output 16 in the form of the outer disk carrier 52. The input 18 of the clutch K1 is formed by the outer disk carrier 54. The output 20 of the clutch K1 is implemented with the aid of the inner disk carrier 56, the inner disk carrier 56 connects the clutch K1 to the transmission input shaft 22, designed as a hollow shaft. In the case of the clutch K1 as well, which can also be designed as a multi-disk clutch, inner clutch disks and outer clutch disks, which form a disk pack, are located between the input and the output or between the outer disk carrier 54 and the inner disk carrier 56.

Moreover, the input 18 of the clutch K1, i.e., the outer disk carrier 54, is connected to the connecting shaft 24. In this way, the second drive unit 3 can also be connected to the input of the clutch K2 via the input of the clutch K1.

In all exemplary embodiments, the transmission input shaft 30 is understandable either as a multiple-part shaft or the connecting shaft 24 can also be considered to be a transmission input shaft. In this case, the shaft referred to in FIGS. 2 and 3 as the transmission input shaft 30 can also be considered to be the first output shaft. Therefore, a strict definition of function is not to be associated with these concepts; they are utilized primarily for differentiating the individual components of the dual clutch transmission arrangement 4.

It is known, in principle, to connect the two input sides of the clutches of a dual clutch transmission to one another. Usually, however, the disk carriers are directly connected to one another and not via a connecting shaft 24. The connection of the input sides 18 and 26 of the clutches K1 and K2, respectively, with the aid of a shaft allows for the spatially separated arrangement of the clutches K1 and K2. Such an arrangement is not specifically known from the prior art.

FIGS. 5 through 8 show further embodiments of the dual clutch arrangement 48. In these cases, the clutch K1 is located radially outward and the separating clutch K0 is located radially inward. Depending on the embodiment of the disk carriers, the second drive unit 3 can be located either on the transmission side or on the engine side, i.e., on the side of the first drive unit 2.

Figure 5:
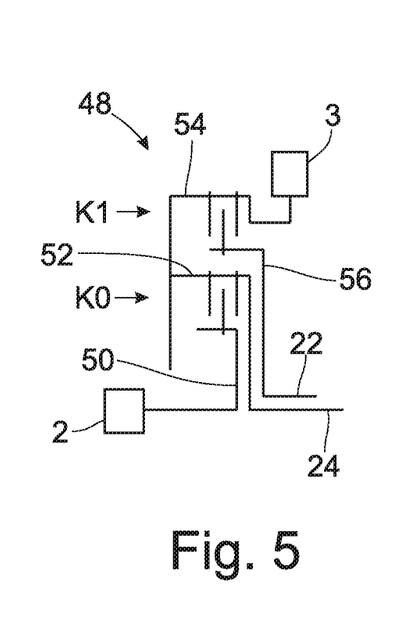
FIG. 5 shows a dual clutch arrangement in a second embodiment.

In the embodiment according to FIG. 5, the inner disk carrier 50 forms the input 14 of the separating clutch K0 and the outer disk carrier 52 forms the output 16. The output 16 or the outer disk carrier 52 is connected to the input 18 of the clutch K1, specifically the outer disk carrier 54 and the connecting shaft 24 in this case. Therefore, the output 16 of the separating clutch K0 is connected to the input of the clutch K1 as well as to the input of the clutch K2. The output of the clutch K1 is formed by the inner disk carrier 56, which connects the clutch K1 to the transmission input shaft 22. The connection usually takes place with the aid of a spline, as described above in several cases. In this embodiment, the second drive unit 3 on the gear set side is connected to the dual clutch arrangement 48. The connection takes place via the input of the clutch K1 and, therefore, automatically via the output of the separating clutch K0.

Figure 6:
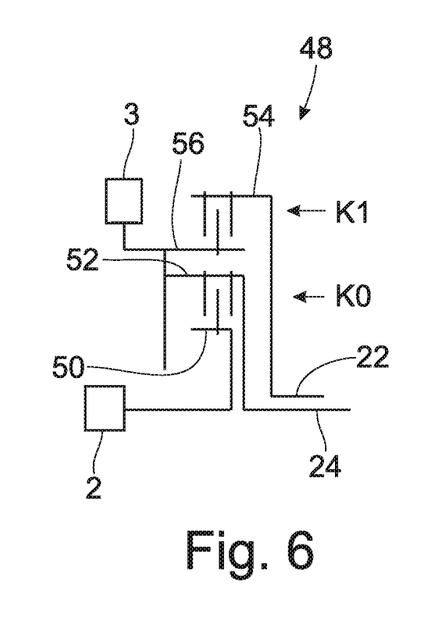
FIG. 6 shows a dual clutch arrangement in a third embodiment.

FIG. 6 shows a configuration similar to that of FIG. 5, which even coincides with the configuration according to FIG. 5 with respect to the separating clutch K0. In the case of the clutch K1, however, the inner disk carrier 56 is utilized as the input 18 and the outer disk carrier 54 is utilized as the output 20. Therefore, the second drive unit 3 can also be arranged on the engine side, i.e., on the side of the drive unit 2. The output 20 of the clutch K1 is coupled, in turn, to the transmission input shaft 22.

Figure 7:
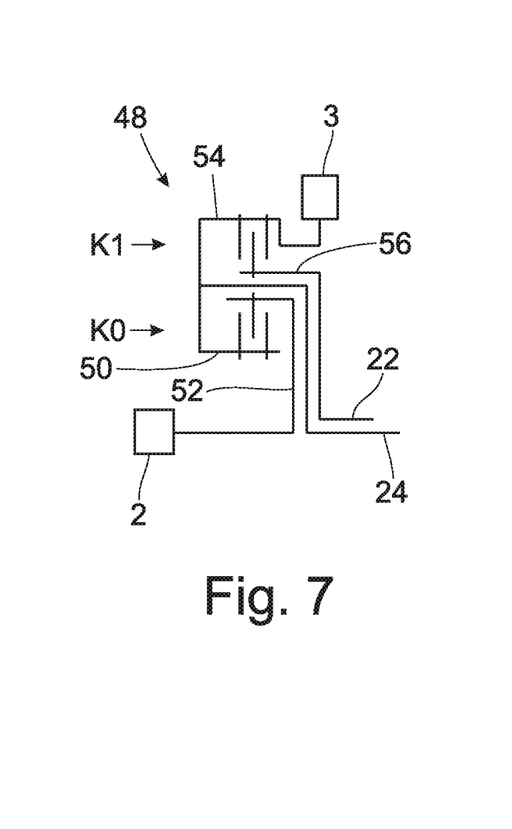
FIG. 7 shows a dual clutch arrangement in a fourth embodiment.

FIG. 7 shows a modification of the embodiment according to FIG. 5, in which the input of the separating clutch K0 is formed by the outer disk carrier 52 and the output 16 of the separating clutch K0 is formed by the inner disk carrier 50. Since the embodiment is identical with respect to the clutch K1, the second drive unit 3 is connected, in turn, on the transmission side. In this embodiment as well, the output 16, i.e., the inner disk carrier 50, of the separating clutch K0 is connected to the input 18, specifically the outer disk carrier 54 in this case, of the clutch K1, and to the input 26 via the connecting shaft 24.

Figure 8:
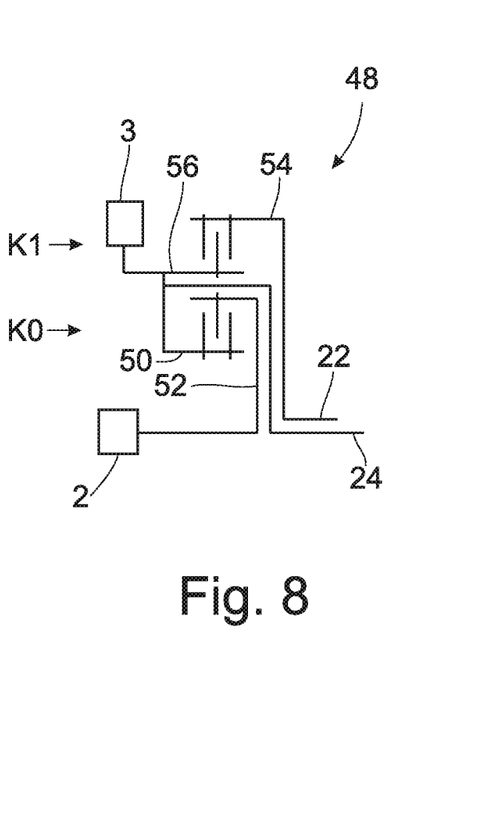
FIG. 8 shows a dual clutch arrangement in a fifth embodiment.

FIG. 8 shows an embodiment in which the function of inner disk carriers and of outer disk carriers as input and output has been interchanged as compared to FIG. 5. Therefore, the outer disk carrier 52 forms the input of the separating clutch K0 and the inner disk carrier 50 forms the output 16. The input 18 of the clutch K1 is therefore formed by the inner disk carrier 56 and the output 20 is formed by the outer disk carrier 54. Therefore, the outer disk carrier 54 is connected to the transmission input shaft 22.

A feature common to all embodiments of FIGS. 4 through 8 is that the output 16 of the separating clutch K0, whether it be the inner disk carrier 50 or the outer disk carrier 52, is connected to the inputs 18 of the clutch K1 and to the input 26 of the clutch K2.

Figure 9:
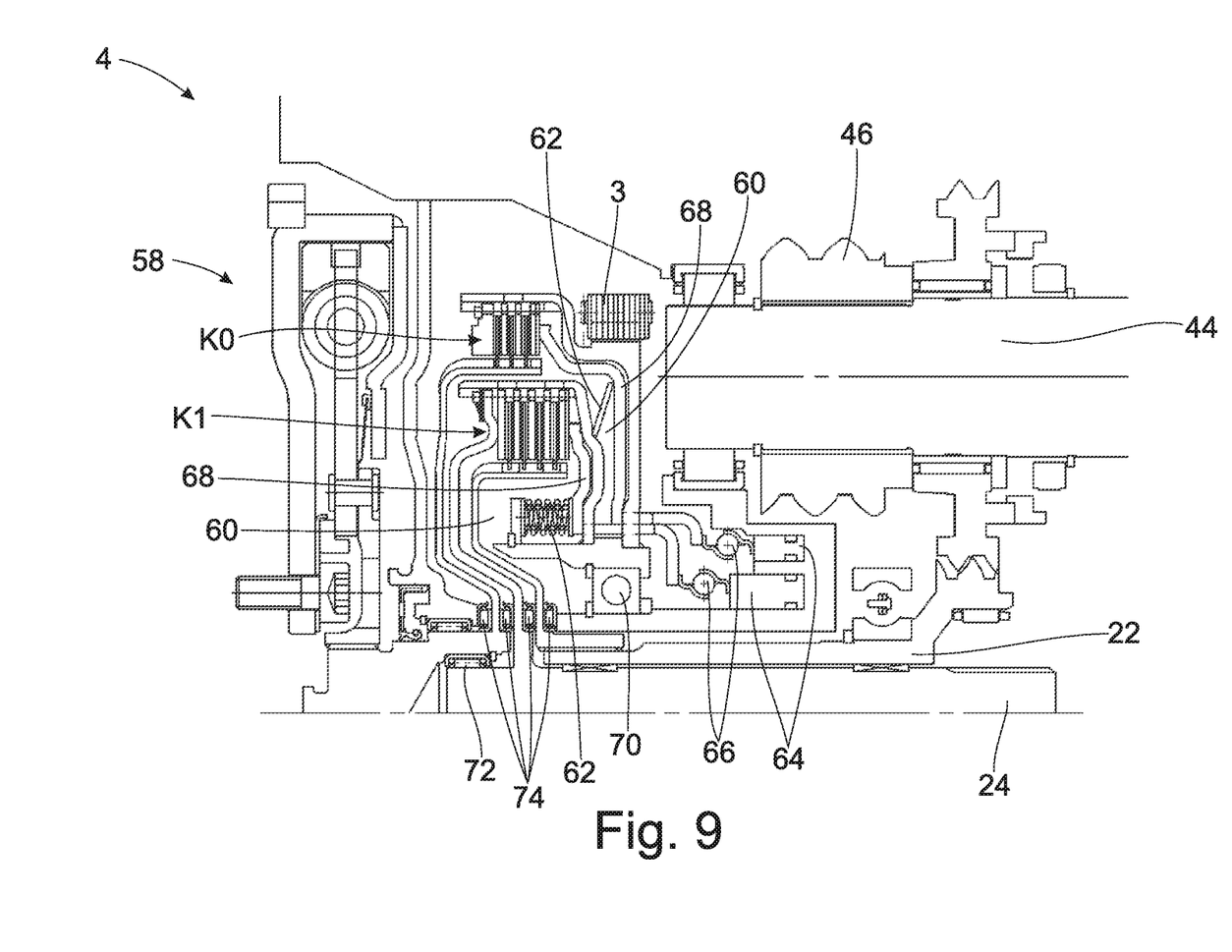
FIG. 9 shows a portion of a dual clutch transmission arrangement in a first view.

FIG. 9 shows a possible implementation of the diagrammatic representation according to FIG. 4, in which the separating clutch K0 is located radially outward and the clutch K1 is located radially inward. Details of the dual clutch transmission arrangement are represented, which are known, in principle, apart from the arrangement of the clutches K0 and K1 with respect to one another. For example, the drive train can include a dual-mass flywheel 58. For example, the clutches can also include pressure compensating cavities 60, in which recoil springs 62 are present. A pressure compensating cavity 60 and a recoil spring 62 are found in the case of hydraulically actuated clutches K0, K1, and K2 in the case of an electro-mechanical actuation. FIG. 9 shows an electro-hydraulic actuation, wherein the electric motors 64 are connected to the actuating elements 68 with the aid of actuating bearings 66 for the purpose of actuation. Grooved ball bearings 70, needle bearings 72, and axial bearings 74 are also represented.

Figure 10:
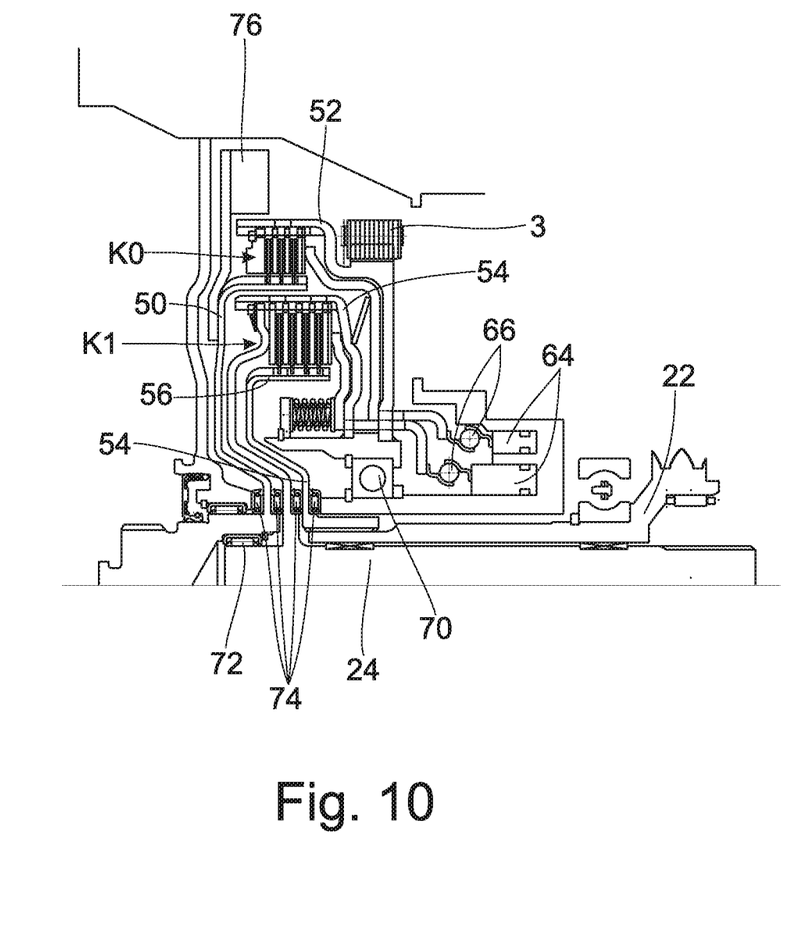
FIG. 10 shows a portion of a dual clutch transmission arrangement in a second embodiment.

FIG. 10 also shows an embodiment of a portion of a dual clutch transmission arrangement corresponding to FIG. 4. The elements described above with respect to FIG. 9, such as actuating motors 64 or actuating bearings 66 are also present and, therefore, are not explained in greater detail.

In contrast to FIG. 9, FIG. 10 shows the possibility of providing a rotational-speed adaptive damper 76 in the wet space. A rotational speed-adaptive damper can be added to each embodiment in order to reduce vibrations. It is usually arranged on an input element of a clutch.

Figure 11:
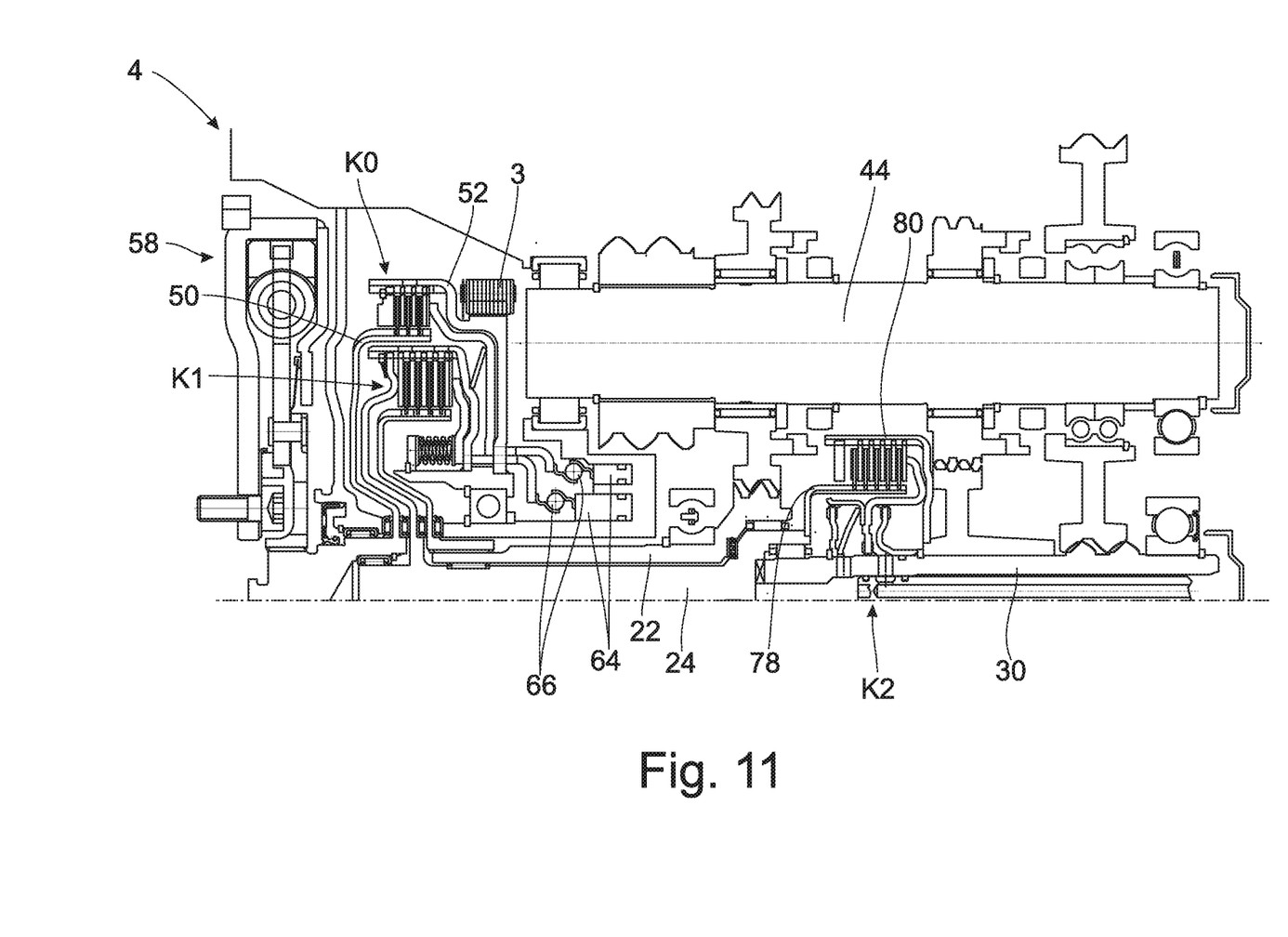
FIG. 11 shows a dual clutch transmission arrangement in a third view.

FIG. 11 shows a total view of the dual clutch transmission arrangement, wherein the clutch K2 is represented in addition to the clutches K1 and K0. In order to avoid repetitions with respect to the configuration of the left half, reference is made to the description of the figures with respect to FIGS. 9 and 10, in which these have already been described. The input 26 in the clutch K2 is connected to the connecting shaft 24; in this case, the input 26 of the clutch K2 is formed by the inner disk carrier 78. The outer disk carrier 80 forms the output of the clutch K2. The output 28 is connected to the transmission input shaft 30. The clutch K2 is arranged between the gear set planes of the transmission input shafts 22 and 30; this configuration corresponds to the configuration according to FIG. 3 in this regard.

Modifications and variations can be made to the embodiments illustrated or described herein without departing from the scope and spirit of the invention as set forth in the appended claims.

REFERENCE NUMBERS 1 motor vehicle
2 first drive unit
3 second drive unit
4 dual clutch transmission arrangement
5 differential
6 transmission housing
7 clutch bell housing
8 set housing
9 intermediate wall
10 line
12 line
14 input
16 output
18 input
20 output
22 transmission input shaft
24 connecting shaft
26 input
28 output
30 transmission input shaft
32 fixed gear
34 idler gear
36 shift element
38 gear set plane
40 gear set plane
42 gear set
44 countershaft
46 fixed gear
48 dual clutch arrangement
50 inner disk carrier
52 outer disk carrier
54 outer disk carrier
56 inner disk carrier
58 dual-mass flywheel
60 pressure compensating cavity
62 recoil spring
64 actuating motor
66 actuating bearing
68 actuating element
70 grooved ball bearing
72 needle bearing
74 axial bearing
76 rotational speed-adaptive damper
78 inner disk carrier
80 outer disk carrier
K0 separating clutch
K1 clutch; coupling; connection
K2 clutch; coupling; connection

The invention claimed is:

1. A dual clutch transmission arrangement (4), comprising:
   a first clutch (K1) configured to selectively connect a drive unit (2) to a first sub-transmission; and
   a second clutch (K2) configured to selectively connect the drive unit (2) to a second sub-transmission,
   wherein the first clutch (K1) is connected to a transmission input shaft of the first sub-transmission and to a transmission input shaft of the second sub-transmission, and
   wherein the first clutch (K1) is a first multi-disk clutch, and the second clutch (K2) is a second multi-disk clutch.

2. The dual clutch transmission arrangement of claim 1, wherein the second clutch (K2) is arranged within a part (8) of a transmission housing (6) that accommodates a gear set (42).

3. The dual clutch transmission arrangement of claim 2, wherein the second clutch (K2) is arranged between two gear set planes (38, 40).

4. The dual clutch transmission arrangement of claim 3, wherein the second clutch (K2) is arranged between two gear sets of odd gears.

5. The dual clutch transmission arrangement of claim 3, wherein the second clutch (K2) is arranged between two gear sets of even gears.

6. The dual clutch transmission arrangement of claim 3, wherein the second clutch (K2) is arranged between two gear sets of even gears and odd gears.

7. The dual clutch transmission arrangement of claim 2, wherein the second clutch (K2) is arranged proximate a transmission-end side of the transmission housing (6) and downstream from two gear set planes (38, 40).

8. The dual clutch transmission arrangement of claim 1, wherein the second clutch (K2) encloses a shaft (22, 24, 30, 44).

9. The dual clutch transmission arrangement of claim 1, wherein the first clutch (K1) is a launch clutch.

10. The dual clutch transmission arrangement of claim 1, wherein the transmission input shafts (22, 24) are coaxially arranged, and the first clutch (K1) is connected on an input side to an inner one of transmission input shafts.

11. The dual clutch transmission arrangement of claim 1, wherein the transmission input shafts (22, 24) are coaxially arranged, and the first clutch (K1) is connected on an output side to an outer one of the transmission input shafts.

12. The dual clutch transmission arrangement of claim 1, wherein the second clutch (K2) is connected on an input side to the transmission input shaft (24) of the second sub-transmission.

13. The dual clutch transmission arrangement of claim 1, further comprising a second drive unit (3), the second drive unit (3) comprising an electric motor.

14. The dual clutch transmission arrangement of claim 1, further comprising a separating clutch (K0) for disconnecting the first drive unit (2) from a drive train, the separating clutch (K0) disposed between the first drive unit (2) and the first and second clutches (K1, K2) in a power flow path from the first drive unit (2) to the drive train.

15. A motor vehicle comprising the dual clutch transmission arrangement of claim 1.

16. The dual clutch transmission arrangement of claim 1, wherein a disk carrier of the first clutch (K1) is connected a disk carrier of the second clutch (K2) by a connecting shaft.

* * * * *